United States Patent [19]
McDilda et al.

[11] Patent Number: 5,814,360
[45] Date of Patent: Sep. 29, 1998

[54] SYSTEM FOR PRODUCING A FILLED ROLLED DOUGH PRODUCT

[75] Inventors: Joseph C. McDilda, Brooklyn Park; Kenneth Litke, Becker, both of Minn.

[73] Assignee: The Pillsbury Company, Minneapolis, Minn.

[21] Appl. No.: 668,550

[22] Filed: Jun. 21, 1996

Related U.S. Application Data

[62] Division of Ser. No. 448,888, May 24, 1995, abandoned.

[51] Int. Cl.[6] .................................................. A21D 10/00
[52] U.S. Cl. .......................... 426/94; 426/138; 426/297; 426/496; 99/450.4; 99/450.6
[58] Field of Search ............................. 426/297, 94, 496, 426/138; 99/470, 450.4, 450.6

[56] References Cited

U.S. PATENT DOCUMENTS

| | | |
|---|---|---|
| 1,501,724 | 7/1924 | Rasmussen . |
| 1,894,077 | 1/1933 | Winkler et al. ............................. 99/517 |
| 2,172,341 | 9/1939 | Berry ................................................ 118/20 |
| 2,214,917 | 9/1940 | Angell ..................................... 426/297 |
| 2,450,033 | 9/1948 | Cohen ..................................... 99/450.7 |
| 2,456,372 | 12/1948 | Buechek ..................................... 107/54 |
| 2,576,670 | 11/1951 | Cohen ..................................... 107/54 |
| 2,888,888 | 6/1959 | Jorgenson et al. ........................ 107/54 |
| 3,172,372 | 3/1965 | Packman ..................................... 107/9 |
| 3,669,007 | 6/1972 | Pulici ..................................... 426/297 |
| 3,704,664 | 12/1972 | Fisher, Jr. ............................... 99/450.2 |
| 3,828,660 | 8/1974 | Mueller er al. ......................... 99/450.7 |
| 3,855,815 | 12/1974 | Wagner ..................................... 62/266 |
| 4,075,869 | 2/1978 | Fitsall ..................................... 62/374 |
| 4,086,784 | 5/1978 | Wagner ..................................... 62/374 |
| 4,171,197 | 10/1979 | Sato ..................................... 99/450.2 |
| 4,171,625 | 10/1979 | Morgan et al. ......................... 99/517 |
| 4,275,647 | 6/1981 | Chambers et al. ..................... 99/450.6 |
| 4,366,178 | 12/1982 | Reynolds et al. ....................... 426/393 |
| 4,526,795 | 7/1985 | Wolf ..................................... 426/297 |
| 4,578,273 | 3/1986 | Krubert ..................................... 426/87 |
| 4,757,691 | 7/1988 | Compagnon ............................. 62/63 |
| 4,878,425 | 11/1989 | Butcher et al. ......................... 99/450.2 |
| 4,931,232 | 6/1990 | Lermuzeaux et al. .................... 364/28 |
| 4,961,949 | 10/1990 | Barnes et al. ........................... 426/518 |
| 4,994,293 | 2/1991 | Hayashi ..................................... 426/501 |
| 4,996,915 | 3/1991 | Morikawa et al. .................... 99/450.2 |
| 5,112,631 | 5/1992 | Nakamura ............................. 426/297 |
| 5,120,559 | 6/1992 | Rizvi et al. ............................. 426/446 |
| 5,123,261 | 6/1992 | Cope ..................................... 62/374 |
| 5,205,106 | 4/1993 | Zimmermann et al. ................ 53/118 |
| 5,290,577 | 3/1994 | Tashiro ..................................... 426/297 |
| 5,292,846 | 3/1994 | McDilda et al. ....................... 426/549 |
| 5,306,513 | 4/1994 | Colucci et al. ........................ 526/139 |
| 5,370,734 | 12/1994 | Ferrero ..................................... 99/516 |

FOREIGN PATENT DOCUMENTS

| | | |
|---|---|---|
| 0 350 352 | 6/1989 | European Pat. Off. . |
| 0 478 316 A1 | 9/1991 | European Pat. Off. . |
| 2 706 250 | 10/1993 | France . |
| 500761 | 6/1930 | Germany . |
| 3512923 A 1 | 7/1985 | Germany . |
| 40 40 429 A 1 | 7/1991 | Germany . |

OTHER PUBLICATIONS

"Pillsbury's Bake Off Cook Book", p. 136, 1969.

*Primary Examiner*—Lien Tran
*Attorney, Agent, or Firm*—Westman, Champlin & Kelly, P.A.

[57] ABSTRACT

A conveyor moves a dough sheet along a dough travel path. A filling applicator, located proximate the dough travel path, applies filling to the dough sheet. A cooler is located downstream of the filling applicator along the dough travel path. The cooler cools the filling applied to the dough sheet sufficiently to increase viscosity of the filling prior to the dough sheet being rolled to form a rolled dough product.

12 Claims, 4 Drawing Sheets

SYSTEM FOR PRODUCING A FILLED ROLLED DOUGH PRODUCT

This is a divisional of application Ser. No. 08/448,888, filed May 24, 1995 now abandoned.

BACKGROUND OF THE INVENTION

The present invention relates to processing rolled dough products. More particularly, the present invention relates to cooling filling in a rolled dough product prior to rolling the dough.

Dough processors for processing rolled dough products are known. Conventional rolled dough processors provide a sheet of dough on a conveyor. The conveyor moves the dough through a series of knives or cutters which slit and score the dough. The dough is then advanced beyond the cutters, and filling is applied to the top of the dough as it advances.

Once the filling is applied to the dough, the individual dough pads which were slit and scored by the cutters are rolled up to form the rolled dough product. After being rolled, the filling which previously resided on the top of the dough sheet, is rolled within the dough product as the desired filling. Once the product is rolled, it is packaged in cans or other suitable packages.

Certain problems commonly arise in rolled dough processors. The filling which is typically applied to the dough is fat-based filling giving it a changing viscosity profile over a temperature range. It has traditionally been applied to the dough by spraying. The filling is sprayed through a pressurized atomizing or dispersion nozzle. In order for the filling to be sprayable, it must be heated to become less viscous than it is at typical room temperatures. However, the less viscous filling sprayed on the surface of the dough presents problems during the rolling process.

The rolling process is typically initiated by raising the leading edge of the individual pads of dough cut by the cutters. The leading edge of each pad is raised and then rolled back over the remainder of the dough pad. It is intended that the leading edge of the pad "grab" the remainder of the dough pad such that, as rolling force is exerted on the pad, the dough pad rolls up on itself in a tight cylindrical roll.

However, because the filling is heated before it is sprayed, the filling looses viscosity and becomes "slippery". Thus, as the leading edge of the dough pad is rolled back upon itself, it engages the slippery filling and, rather than grabbing and rolling, it simply slips along the slippery surface and ends up having only a single fold, being very loosely rolled, or being rolled but having an elliptical cross-section. All of these are undesirable both from an aesthetic stand point. (which is a consumer perception issue), and because such non-cylindrical dough products cause difficulty during the packaging operation.

In order to overcome this problem, a number of modifications to the process have been attempted. The first modification was simply to decrease the amount of filling applied to the dough. While this was somewhat successful in making the dough products more rollable, it is desirable from a taste standpoint to fill the dough products with reasonably high levels of filling. Thus, decreasing the amount of filling applied to the dough is undesirable.

Another attempted solution to the present problem was to change the type of fat used in the filling. However, this proposed solution is undesirable because there are only a limited number of fats which can be used, due to the characteristics sought in the fat. For example, the filling must be solid at refrigerated temperatures so it will not flow in packaging. This is also required to maintain some acceptable modicum of shelf life. Thus, switching fats is generally considered undesirable. In this regard, since water-based fillings have a non-changing viscosity profile over temperature, they are unacceptable as well Another attempt to overcome the problems encountered in processing rolled dough products was to use cooler (and hence more viscous) filling. Such viscous filling is not easily pumpable or sprayable. Thus, the filling was applied to the dough products in strips using an extrusion process. However, this resulted in other problems.

In the extrusion process, the filling was pumped to an extrusion manifold and the filling was extruded onto the dough. However, the extrusion process was not easily controllable and suffered from large performance variations. One major problem associated with the extrusion process was that it was very difficult to uniformly disperse the filling across the extrusion manifold. This resulted in wide variation in filling levels across the dough sheet. Another major problem encountered was that the cooler filling tended to solidify in the extrusion equipment rendering the equipment essentially inoperable without frequent cleaning. These problems greatly increased manufacturing shrink (or waste) when increased filling levels were applied to the dough.

SUMMARY OF THE INVENTION

The present invention provides a system for applying filling to a rolled dough product. A conveyor moves the dough sheet along a dough travel path. A filling applicator, located proximate the dough travel path, applies filling to the dough sheet. A cooler is located downstream of the filling applicator along the dough travel path. The cooler cools the filling applied to the dough sheet sufficiently to increase viscosity of the filling prior to the dough sheet being rolled to form the rolled dough product.

DETAILED DESCRIPTION OF THE PREFERRED EMBODIMENTS

Figure 1:
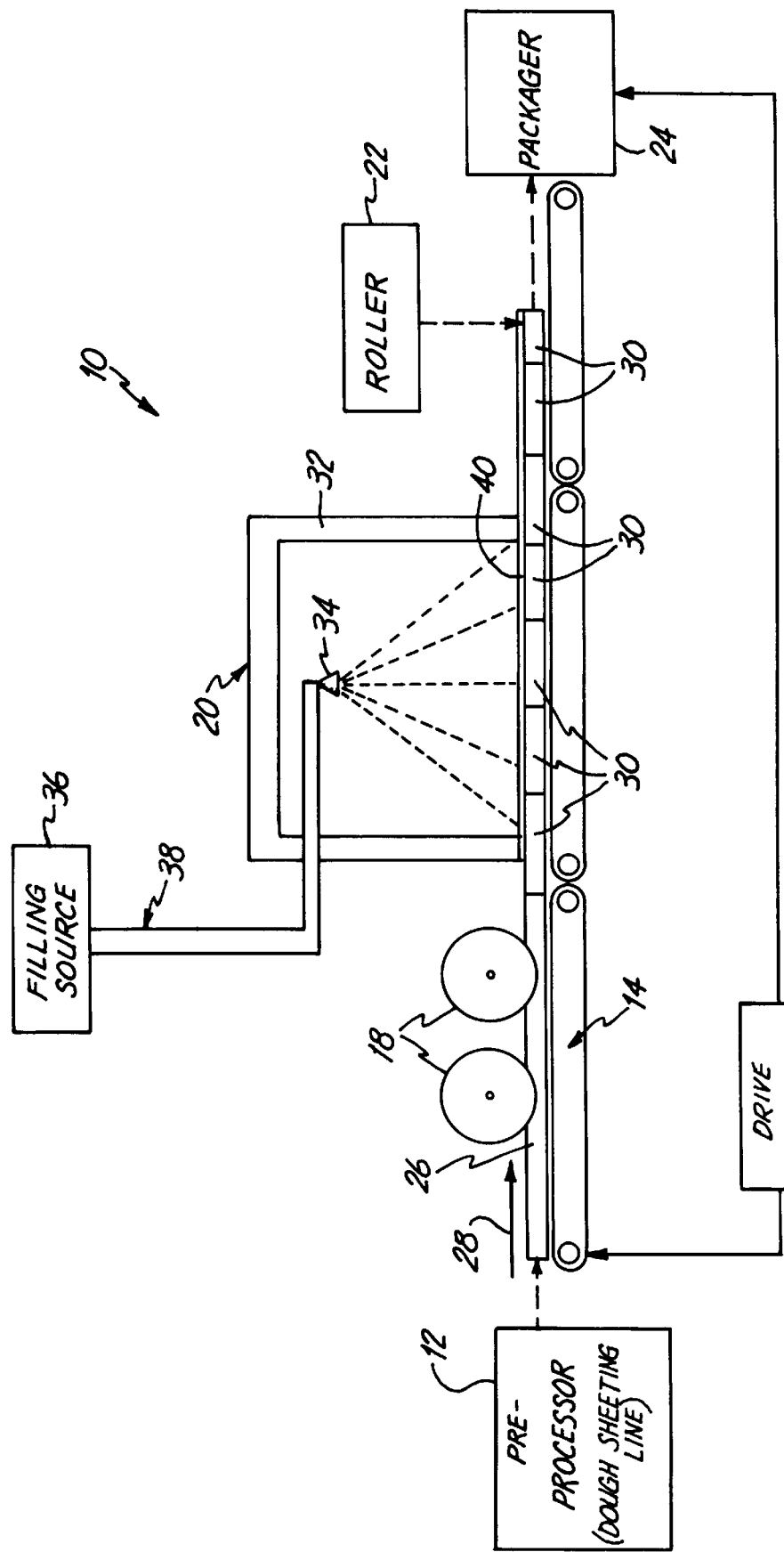
FIG. 1 illustrates a conventional dough processing system of the prior art, shown in partial block diagram form.

FIG. 1 illustrates a dough processing and filling application system 10 according to the prior art. System 10 includes preprocessor (or dough sheeting line) 12, conveyor 14, drive motor 16, slitter and scorer rolls 18, filling delivery system 20, roller 22 and packager 24.

Preprocessor 12 varies depending on the particular dough and dough product being processed. However, preprocessor 12 typically includes dough extrusion and reduction equipment The dough extrusion equipment extrudes a sheet of dough suitable for processing. The reduction equipment typically rolls, or reduces, the sheet of dough to a desired thickness and a desired number of layers. Other known equipment may also be used in preprocessor 12 to provide a dough sheet suitable for receiving filling.

After being preprocessed, a dough sheet 26 is provided to the filling application portion of system 10. Dough sheet 26 is moved through the filling application portion by a set of conveyors 14. Conveyors 14 are driven by a drive motor 16 which is operably coupled to conveyor 14 in any suitable manner.

Drive motor 16 drives conveyors 14 to move dough sheet 26 along a dough travel path in a direction generally indicated by arrow 28. Dough sheet 26 progresses along the dough travel path to slitter and scorer rolls 18. Slitter and scorer rolls 18 are rotatably mounted in generally opposing relation to conveyor 14. Slitter and scorer rolls 18 include knives and scorers on their exterior periphery. Therefore, as slitter and scorer rolls 18 rotate, and as dough sheet. 26 moves along conveyors 14 relative to slitter and scorer rolls 18, dough sheet 26 is slit and scored into individual dough pads 30.

Dough sheet 26 (which has been formed into pads 30) is then moved along the dough travel path to filling delivery system 20. Filling delivery system 20 includes filling spray booth 32, filling spray nozzle 34, and filling source 36. Conventional filling, such as typical cinnamon filling, is generally fat-based. Therefore, filling source 36 heats the filling to reduce the viscosity of the filling so that it is more easily pumpable through conduit 38. The filling is supplied under pressure to dispersion nozzle or atomization nozzle 34. Nozzle 34 sprays filling downwardly onto pads 30 of dough sheet 26 such that a filling layer 40 is formed on the top of pads 30.

Pads 30 are then advanced by conveyors 14 to roller 22. Roller 22 rolls pads 30 into generally cylindrical rolled dough products. The rolled dough products are packaged into cans, or other suitable containers, by packager 24. The configuration of roller 22 does not form part of the present invention and can take one of any number of forms, such as a manual hand roller, opposing conveyors, or any other suitable roller.

Figure 2:
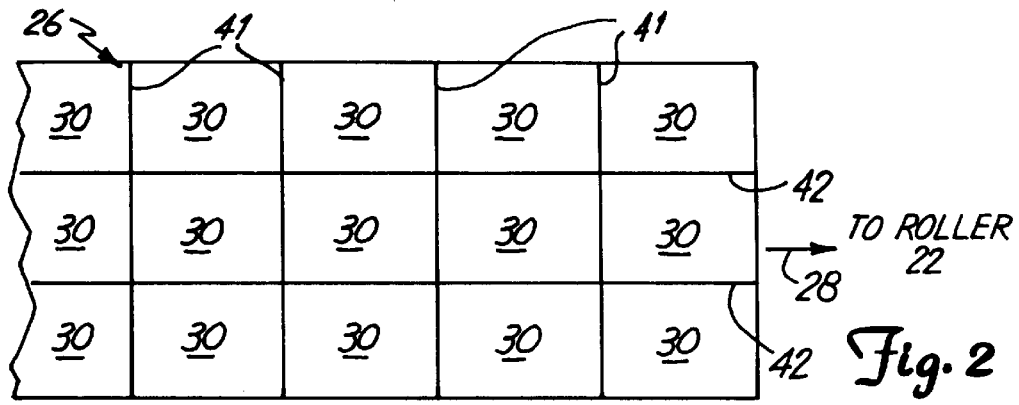
FIG. 2 is a top view of a sheet of dough after it has been slitted and scored and after filling has, been applied to it.

FIG. 2 shows a top view of dough sheet 26 after it has been cut into individual pads 30 along cut lines 41 and 42 and after filling layer 40 has been applied thereto. For the sake of clarity, the filling layer 40 is not separately shown in FIG. 2. In addition, dough sheet 26 is also scored, or perforated, along lines generally parallel to cut lines 42. Thus, after each pad 30 is rolled, it can be easily broken apart into a number of individual, rolled dough products. However, for the sake of clarity, the perforations are not illustrated in FIG. 2.

Figure 3A:
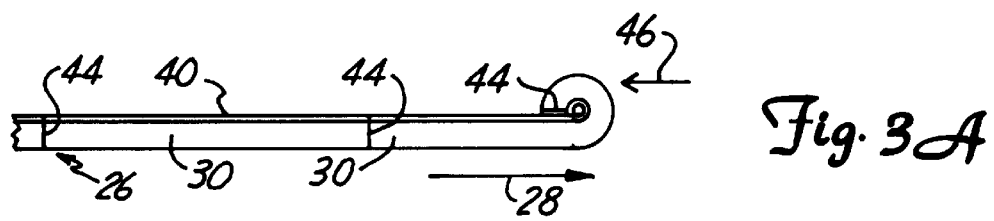
FIG. 3A is a side view illustrating desirable roll-up of a dough product.
Figure 3B:
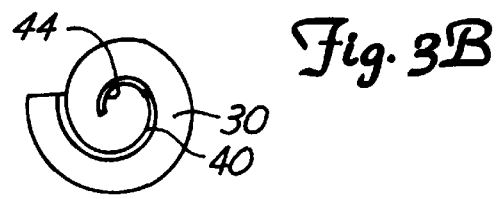
FIG. 3B is a side view of a completely rolled dough product.

FIG. 3A is a side view of dough sheet 26, and illustrates a desired rolling process. As pads 30 move along conveyors 14 in the direction indicated by arrow 28, the leading edge 44 of pads 30 reach roller 22. Roller 22 lifts the leading edge 44 of pads 30 and applies a rolling force having a vector generally in the direction indicated by arrow 46. Ideally, each pad 30 rolls over on itself so that leading edge 44 catches, or grabs, the top surface of pad 30. Then, as pad 30 advances in the direction indicated by arrow 28, the rolling force vector 46 causes pad 30 to roll up on itself in a tight, substantially cylindrical roll. Such a cylindrical roll is illustrated in FIG. 3B. Once rolled, pad 30 forms a rolled dough product with filling 40 rolled within pad 30.

Figure 3C:
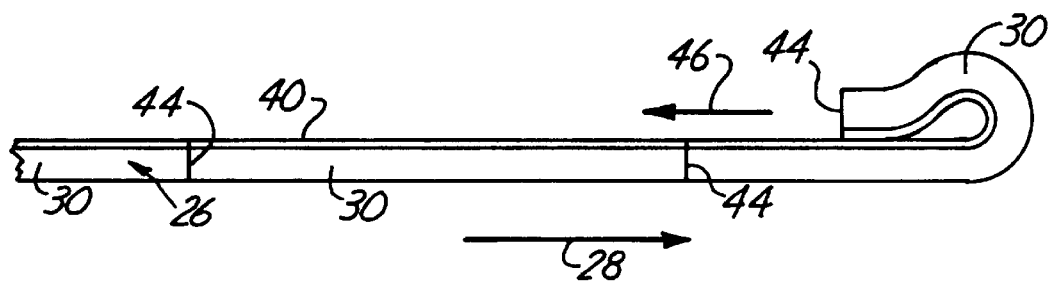
FIG. 3C illustrates problems in rolling associated with prior art dough processing systems.

FIG. 3C illustrates a problem with prior dough processing system 10 which results in a great deal of waste, or manufacturing shrink. Because filling 40 was heated prior to being sprayed by filling delivery system 20, it is still generally at quite an elevated temperature after exiting spray booth 32. Thus, the viscosity of filling 40 is quite low, which results in a "slippery" surface on the top of pads 30. This causes roll-up to commonly deviate from the desirable roll-up operation shown in FIG. 3A.

As the leading edge 44 of dough pad 30 is lifted, and as dough pad 30 is folded back on itself, leading edge 44 does not "grab" the top surface of dough pad 30, as is desired. Instead, leading edge 44 engages the "slippery" surface of dough pad 30 (made slippery by the low viscosity filling layer 40) and slides along that surface in the direction indicated by arrow 46. Once dough pad 30 reaches the position shown in FIG. 3, the filling disposed on the surface of the leading portion of dough pad 30 engages the filling disposed on the central or trailing portion of dough pad 30. This results in two "slippery" surfaces being in contact with one another, and the dough pad 30 either rolls very loosely in a non-cylindrical fashion, or it does not roll at all but simply folds in half or flips over. In either case, the dough pad cannot be packaged and is wasted.

Figure 4:
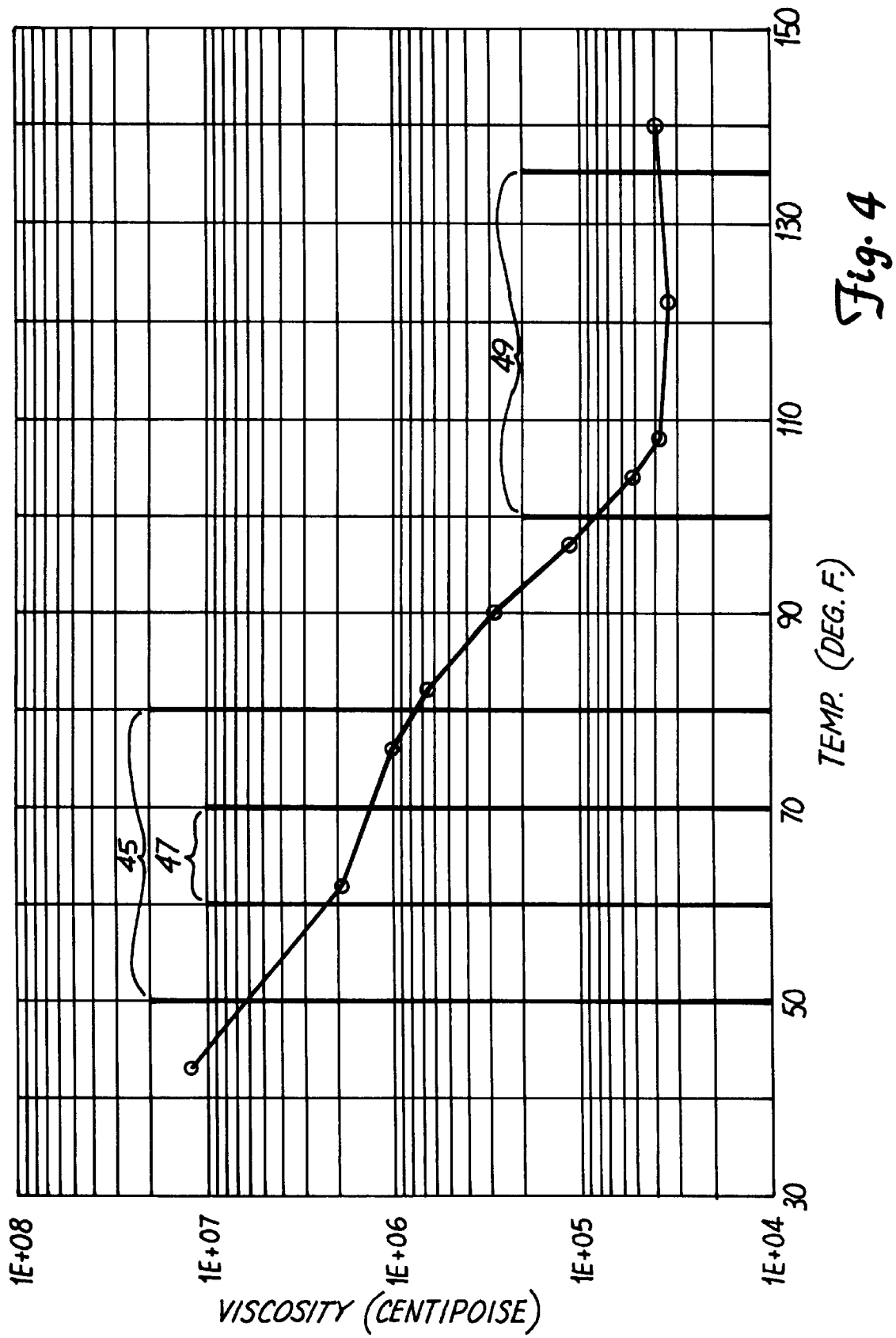
FIG. 4 is a graph of filling viscosity versus filling temperature.

FIG. 4 is a graph generally illustrating the relationship between fat-based filling viscosity and filling temperature. FIG. 4 specifically relates to a cinnamon filing, but shows a profile typical of many fat-based fillings. FIG. 4 shows that as the temperature increases, the viscosity of the filling generally decreases. Also, as the temperature of the filling decreases, the viscosity of the filling generally increases. Thus, the warmer the filling is made during the spraying operation, the easier it is to spray. However, the warmer the filling, the more slippery the filling. Further, the cooler the filling is made, the more viscous it is, and the easier it is to roll. However, as the filling is cooled, it becomes more difficult to spray. FIG. 4 shows three temperature ranges 45, 47 and 49. These ranges are discussed in greater detail below.

Figure 5:
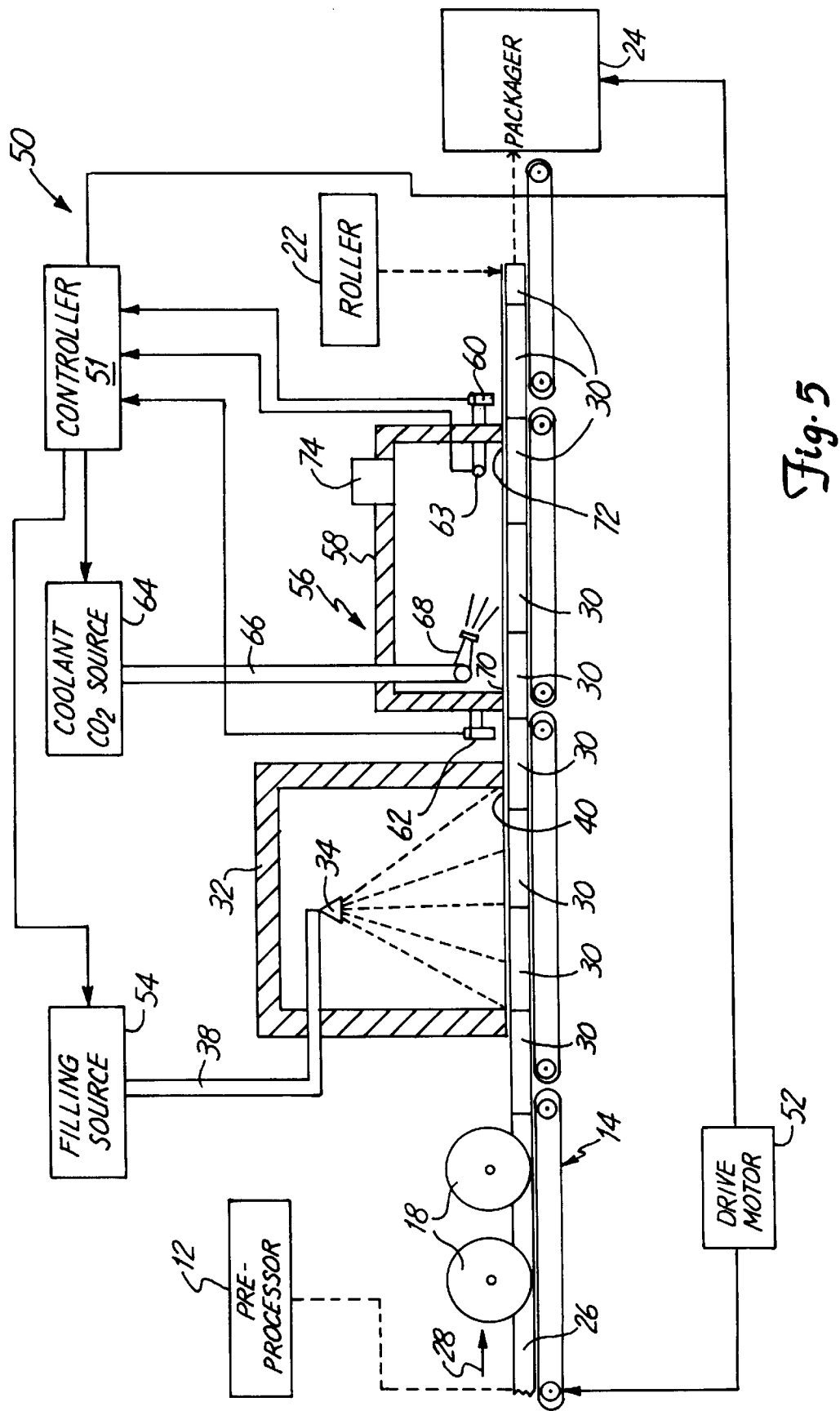
FIG. 5 illustrates the filling application system according to the present invention, shown in partial block diagram form.

FIG. 5 illustrates filling application system 50 according to the present invention, shown in partial block diagram form. Similar items to those shown in FIG. 1 are similarly numbered. As with system 10 shown in FIG. 1, dough is provided to the system by a preprocessor 12 in the form of a dough sheet 26 traveling along a dough travel path indicated by arrow 28. The dough is slitted and scored by slitter and scorer rolls 18 and is advanced by conveyors 14. In addition, heated filling is applied to pads 30 of dough sheet 26 by dispersion nozzle 34 which receives filling through conduit 28. Pads 30 are eventually rolled by roller 22 and packaged by packager 24.

However, system 50 preferably includes a number of different or additional elements as well. System 50 preferably includes controller 51 which is coupled to drive motor 52, filling source 54 and filling coolant system 56. Controller 51 is preferably a digital computer with a user interface, associated memory and other timing and control circuitry which is generally known. Alternatively, controller 51 can be a microcontroller, or a programmable logic controller, as desired.

Motor 52, rather than simply being a drive motor such as motor 16 shown in FIG. 1, is a controllable motor (such as a stepper motor or a servo motor) which has a control input that controls the speed of the motor. The control input preferably receives a control signal from controller 51 which controls the speed of motor 52. Drive motor 52 is also preferably the main drive for the packager 24.

Filling source 54 is preferably not a simple pressurized source, such as filling source 36 shown in FIG. 1. Instead, filling source 54 includes a controllable positive displacement or other suitable pump. Controllable valves, controlled by controller 51., are placed in the piping associated with the filling source 54 to control pressure and flow along with the rpm rate of the pump.

Filling coolant system 56 includes a cooling tunnel 58, a first infrared temperature sensor 60, a second infrared temperature sensor 62, thermocouple 63, coolant source 66 and coolant spray nozzle 68. Cooling tunnel 58 has an inlet 70 and an outlet 72 which can be completely open ends of tunnel 58, or which can be formed to more closely conform to dough sheet 26. Tunnel 58 also includes exhaust outlet 74 for exhausting the coolant.

Tunnel 58 is preferably formed of an insulated stainless steel housing which is generally disposed about a portion of the dough travel path and terminates at its lower end just at the top surface of conveyor 14 to encompass dough sheet 26. In one preferred embodiment, tunnel 58 is a commercially available cooling tunnel made by Cryogenic Systems Equipment of Orland Park Ill. or by Air Liquide America Corporation of Houston, Tex. Tunnel 58 can be secured about, or sealed about, conveyor 14, or it can be loosely fitting about conveyor 14 depending on the type of coolant used and the desired coolant performance.

Coolant source 64 provides coolant under pressure, through conduit 66, to spray nozzle 68. Coolant source 64 includes a controllable pump, or controllably actuable valves for controlling delivery of the coolant. The control inputs to the pump and valves are connected to controller 51 and receive control signals from controller 51 to control delivery of the coolant. The coolant is preferably liquid carbon dioxide ($CO_2$) or nitrogen. The particular coolant used can be anything suitable that exhibits an endothermic expansion coefficient.

Coolant delivery system 56 also preferably includes three temperature sensors. A first infrared temperature sensor 60 is preferably coupled proximate outlet 72 of tunnel 58 to sense the temperature of filling 40 as it exits outlet 72. Optionally, second infrared sensor 62 is preferably disposed proximate inlet 70 of tunnel 58 to sense the temperature of filling 40 as it enters tunnel 58. Also, thermocouple 63 may optionally be disposed within tunnel 58 to sense the temperature within tunnel 58 proximate the filling layer 40 on dough sheet 26. The infrared temperature sensors 60, 62 are preferably infrared thermometers. All three temperature sensors are commercially available sensors. Any of temperature sensors 60, 62 and 63 implemented in a particular preferred embodiment are coupled to controller 51 and provide temperature sensor signals to controller 51 indicative of the temperature sensed by each sensor.

In operation, pads 30 are sprayed with filling 40 which is at an elevated temperature. In the preferred embodiment, the temperature of the filling is raised to a point where the filling is easily sprayable. The temperature at which this occurs will vary depending on the viscosity profile of the filling. However, it has been observed that a viscosity range of approximately 30,000–80,000 centipoise is preferable. With one filling tested, this required a filling temperature in a range of approximately 100° F. to 135° F. This is indicated by range 49 shown in FIG. 4.

Pads 30, with filling disposed thereon, exit booth 32, pass temperature sensor 62 in an embodiment in which sensor 62 is used, and enter inlet 70 to tunnel 58 at an elevated temperature. The temperature at which the filling enters tunnel 58 is sensed by temperature sensor 62 (if used) and provided to controller 51. It has been observed that this temperature (using the same filling mentioned above) is approximately 90°–100° F. Controller 51 controls coolant source 64 to provide coolant through conduit 66 to spray nozzle 68.

In the preferred embodiment, spray nozzle 68 is actually formed of 12 nozzles equally spaced over 30 inches located in a direction transverse to dough travel. This nozzle assembly is collectively referred to as nozzle 68. Nozzle 68 is located proximate inlet 70 and is angled generally downwardly and rearwardly. The particular angle of nozzle 68 (the impingement angle of the coolant assuming a vertical downward direction is zero degrees and a horizontal, rearward facing direction is ninety degrees) should be set to eliminate or reduce flipping of pads 30 in tunnel 58. The most desirable impingement angle will depend on the particular design of tunnel 58, the size and weight of pads 30 and conveyor line speed. The impingement angle is preferably in a range of approximately 25 to 89 degrees, and has been observed to work adequately at 85 degrees Also, it should be noted that if the nozzle 68 is faced directly toward inlet 70 or outlet 72 the tunnel cooling efficiency is greatly reduced. Further, with nozzle 68 placed at a 90° angle, solid $CO_2$ tends to build up on the interior walls of tunnel 58 creating $CO_2$ "snow" which can undesirably fall on the dough sheet.

As the coolant is expelled from nozzle 68, it expands thereby cooling the temperature within tunnel 58. The expanded coolant gas is then exhausted through exhaust 74 to an appropriate station.

The temperature inside tunnel 58 is sensed by thermocouple 63 and provided to controller 51. In addition, as pads 30 exit tunnel 58 through outlet 72, the temperature of the filling 40 on pads 30 is sensed by infrared temperature sensor 60. This temperature is also provided to controller 51.

In the preferred embodiment, controller 51 is preprogrammed with the characteristics of the particular filling used. Such characteristics include a relationship between filling viscosity and filling temperature, or a look-up table which correlates the filling temperature to the filling viscosity. In an even simpler embodiment, controller 51 is simply programmed to keep the temperature of the filling sensed by infrared temperature sensor 60 as the filling exits tunnel 58 in a desired range. In another embodiment, controller 51 is eliminated, or replaced by a display, or the temperature sensors have their own displays, and the filling temperature is displayed. Manually actuable operator inputs are then manipulated by an operator, based on the displayed temperature, to maintain viscosity in a desired range.

In any case, the viscosity of the filling, after it exits tunnel 58, is preferably maintained in a desired range so that it obtains desired tackiness, or stickiness, such that it can be easily rolled as illustrated in FIG. 3A. The preferred viscosity range has been observed to be approximately $1.5 \times 10^6 - 2.3 \times 10^6$ centipoise. This is shown by range 47 in FIG. 4. However, advantages are also obtained if the viscosity is maintained in a range of approximately $7 \times 10^5 - 6 \times 10^6$ centipoise. This is indicated by range 45 in FIG. 4.

When a fat-based cinnamon filling is used, it has been found that the desired temperature range at which to maintain the filling as it exits tunnel 58 is between approximately 50° F. and 80° F. This is also shown in FIG. 4. The desired temperature range will change depending on the viscosity profile of the filling, the amount of filling applied, the type of roller used, and the particular type of filling used.

Coolant delivery system 56 can be manually operated without the use of some or all of the temperature sensors and without controller 51, and still obtain significant advantages. In one such embodiment any preferred number of temperature sensors are coupled to sense filling temperature at a desired point or points along the processing line. Controller 51 can simply serve as a display, or the temperature sensors provide their own digital or analog displays indicating the sensed temperature. In response to the displayed temperature, an operator manually adjusts a control parameter mentioned above, to bring the displayed temperature into the desired range so that appropriate viscosity is achieved. Such manual adjustments can include, for example, manual adjustments to the line speed or the mass flow rate of coolant being delivered. Further, in an embodiment in which no temperature sensors are used, the desired control parameter is set based on observations by the operator of how well roller 22 is working.

In an embodiment in which controller 51 is used and is implemented as an electronic controller, controller 51 preferably controls the amount of cooling, and hence viscosity, in any of a number of suitable ways. For instance, controller 51 can control the speed of drive motor 52. If additional cooling is desired, controller 51 simply slows motor 52 so that the filling on dough sheet 26 spends a greater time in tunnel 58,, and hence cools to a lower temperature. On the other hand, if the filling is cooled so that it is completely solid, pads 30 cannot be easily rolled either. Therefore, should controller 51 determine from the various temperature signals that the filling is too cool after it exits tunnel 58, controller 51 simply speeds up motor 52 so that the filling spends less time in cooling tunnel 58 and therefore does not cool to such a large extent.

In another embodiment, controller 51 controls the viscosity of the filling as it exits cooling tunnel 58 by controlling the mass flow rate of the filling applied to pads 30 of dough sheet 26. In other words, if controller 51 determines that the filling is still too hot (and hence the viscosity is too low) after it exits tunnel 58, controller 51 controls filling source 54 to reduce the mass flow rate of filling being applied to pads 30 of dough sheet 26. With less filling applied, there is a smaller thermal mass which must undergo temperature reduction in tunnel 58. Therefore, the filling exiting tunnel 58 is cooler, so long as all other parameters remain constant. By contrast, if controller 51 determines that the filling is too cool (or could be warmer) as it exits tunnel 58, controller 51 controls filling source 54 to increase the mass flow rate of the filling being applied to pads 30 of dough sheet 56. This increases the thermal mass which must undergo cooling in tunnel 58 and therefore the filling is at a higher temperature as it exits tunnel 58. This is presently a less preferred embodiment since the amount of filling to be applied to the pads 30 is typically specific for any given product. However, where the specified filling range is wide, this embodiment can be used effectively.

In yet another embodiment, controller 51 controls the mass flow rate of coolant provided by coolant source 64. If controller 51 determines that the filling must undergo additional cooling in tunnel 58, controller 51 controls coolant source 64 to increase the mass flow rate of coolant provided to tunnel 58. This decreases the temperature in tunnel 58 and thus provides additional cooling affects to the filling passing through tunnel 58. Oil the other hand, should controller 51 determine that the filling exiting tunnel 58 is too cool, controller 51 controls the coolant source 64 to decrease the mass flow rate of coolant provided to tunnel 58. This increases the temperature in tunnel 58.

In still another embodiment, controller 51 can also be coupled to the heat source which heats the filling before the filling is pumped to dispersion nozzle 34. The temperature of the filling can be controlled as desired, so long as it maintains necessary viscosity to be sprayed. By utilizing the temperature signals from temperature sensors 62 and 63, controller 51 can also anticipate and make desired corrections before the viscosity of the filling exiting tunnel 58 moves outside the desired viscosity range. For example, should sensor 62 sense that the temperature of the filling entering tunnel 58 through inlet 70 is too high, controller 51 can immediately adjust the mass flow rate of the coolant to provide additional cooling in tunnel 58. The mass flow rate of the coolant can be increased until thermocouple 63 senses that the temperature inside tunnel 58 is at a newly desired temperature. At that time, controller 51 controls coolant source 64 accordingly.

It should also be noted that a number of the controllable devices and sensors can be used, either alone or in combination, to obtain significant advantages. For example, a number of the items can be eliminated. In other words, if controller 51 were simply coupled to temperature sensor 60 and one of drive motor 52, filling source 54 or coolant source 64, controller 51 could maintain significant control over the viscosity of the filling exiting tunnel 58. This yields significant advantages even though controller 51 may not be able to anticipate temperature changes required, and even though controller 51 may not be able to control all of drive motor 52, filling source 54 and coolant source 64.

Also, it should be noted that the control signals provided by controller 51 are all preferably serial digital signals, parallel digital signals or analog signals provided by an analog control loop. In addition, all control signals or control loops controlled by controller 51 preferably include feedback to controller 51.

Further, it is to be understood that all of the above control operations performed by controller 51 can be performed manually by an operator based on observations of the performance of the rolling operation. This accomplishes control of the production line based on the viscosity profile of the filling.

Due to the exceedingly high viscosities of the filling, a method was developed to determine these viscosities within the desired temperature range. The method involves displacing or pushing the fluid at the desired temperature through a capillary tube of known diameter. The fluid is displaced using a plunger of known diameter connected to an Instron Universal Testing Instrument, Model 1011 or equivalent. Using the above parameters in combination with the plunger rate of travel, shear stress and shear strain can be calculated in a known manner. Viscosity is thereby easily calculated as the ratio of shear stress to shear strain. The validity of this test procedure was checked at lower viscosities (increased temperature) using a Brookfield viscometer.

The present invention has been used to increase the amount of filling applied to rolled dough products from approximately 4% by weight (weight of filling to weight of dough) attainable by previous systems, to in excess of 13% by weight.

Although the present invention has been described with reference to preferred embodiments, workers skilled in the art will recognize that changes may be made in form and detail without departing from the spirit and scope of the invention.

What is claimed is:

1. A method of processing a rolled dough product the method comprising:

moving a dough sheet along a dough travel path;

applying a filling to the dough sheet; and exposing the filling on the dough sheet to a cooling source prior to the dough sheet being rolled so that the filling attains a viscosity in a desired range effective to obtain a desired tackiness so that the dough sheet containing the filling can be easily rolled to form the rolled dough product.

2. The method of claim 1 wherein exposing the filling comprises:

a sensing a temperature of the filling and providing a temperature signal indicative of the temperature sensed; and exposing the filling based on the temperature signal.

3. The method of claim 1 wherein exposing the filling comprises:

moving the dough sheet with the filling applied thereto through a cooler; and controlling a speed of the dough sheet through the cooler so that the filling attains the viscosity in the desired range.

4. The method of claim 1 wherein exposing the filling comprises:

moving the dough sheet with the filling applied thereto through a cooler; and controlling a mass flow rate of filling applied to the dough sheet so that the filling attains the viscosity in the desired range through the cooler.

5. The method of claim 1 wherein exposing the filling comprises:

moving the dough sheet with the filling applied thereto through a cooler; and controlling a temperature of the cooler so that the filling attains the viscosity in the desired range.

6. The method of claim 5 wherein the cooler comprises:

a tunnel disposed relative to a portion of the dough travel path to cool the filling on dough sheet traveling along the portion of the dough travel path; and wherein exposing comprises delivering a coolant to the tunnel to lower a temperature in the tunnel.

7. The method of claim 6 wherein controlling a temperature of the cooler comprises:

controlling the temperature in the tunnel by controlling a mass flow rate of the coolant delivered to the tunnel.

8. The method of claim 1 wherein exposing the filling comprises:

cooling the filling to attain a viscosity in a range of $7 \times 10^5$ to $6 \times 10^6$ centipoise.

9. The method of claim 1 wherein exposing the filling comprises:

cooling the filling to attain a viscosity in a range of $1.5 \times 10^6$ to $2.3 \times 10^6$ centipoise.

10. A method of applying filling to a sheet of dough to make a rolled dough product, the method comprising:

moving the sheet of dough along a dough travel path;

applying the filling to the sheet of dough; and exposing the filling on the sheet of dough to a cooling source prior to the sheet of bough being rolled so that the filling attains a desired temperature range to obtain a desired tackiness so that the sheet of dough containing the filling can be easily rolled into the rolled dough product.

11. The method of claim 10 wherein exposing comprises:

moving the sheet of dough, having the filling applied thereto, through a cooling tunnel having a temperature reduced relative to ambient temperature outside the cooling tunnel.

12. The method of claim 11 and further comprising:

controlling cooling of the filling so that the filling has a viscosity which meets a selected threshold.

* * * * *